Dec. 11, 1962  B. A. HORNING  3,067,637
UNDERCUTTING TOOL
Filed May 27, 1960  7 Sheets-Sheet 1

INVENTOR.
BERNARD A. HORNING
BY
McMorrow, Berman & Davidson
ATTORNEYS

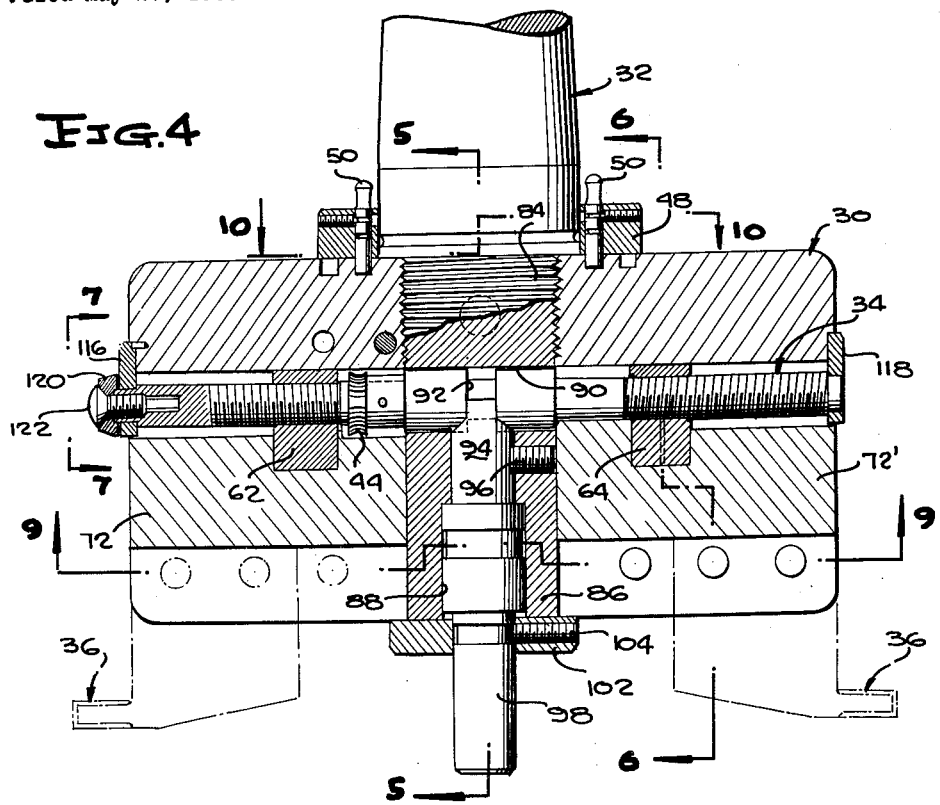
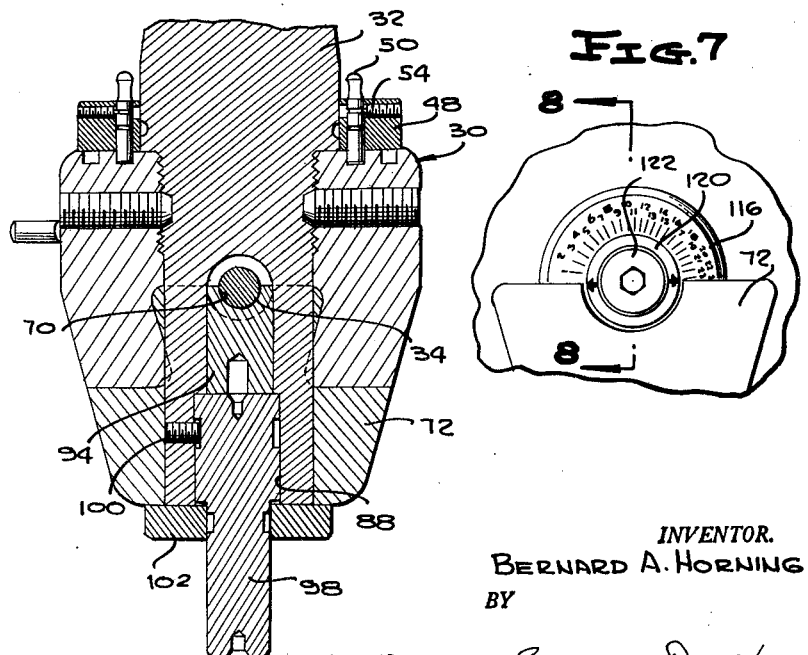

Dec. 11, 1962  B. A. HORNING  3,067,637
UNDERCUTTING TOOL
Filed May 27, 1960  7 Sheets-Sheet 3

INVENTOR.
BERNARD A. HORNING
BY
McMorrow, Berman & Davidson
ATTORNEYS

Dec. 11, 1962  B. A. HORNING  3,067,637
UNDERCUTTING TOOL
Filed May 27, 1960  7 Sheets-Sheet 4
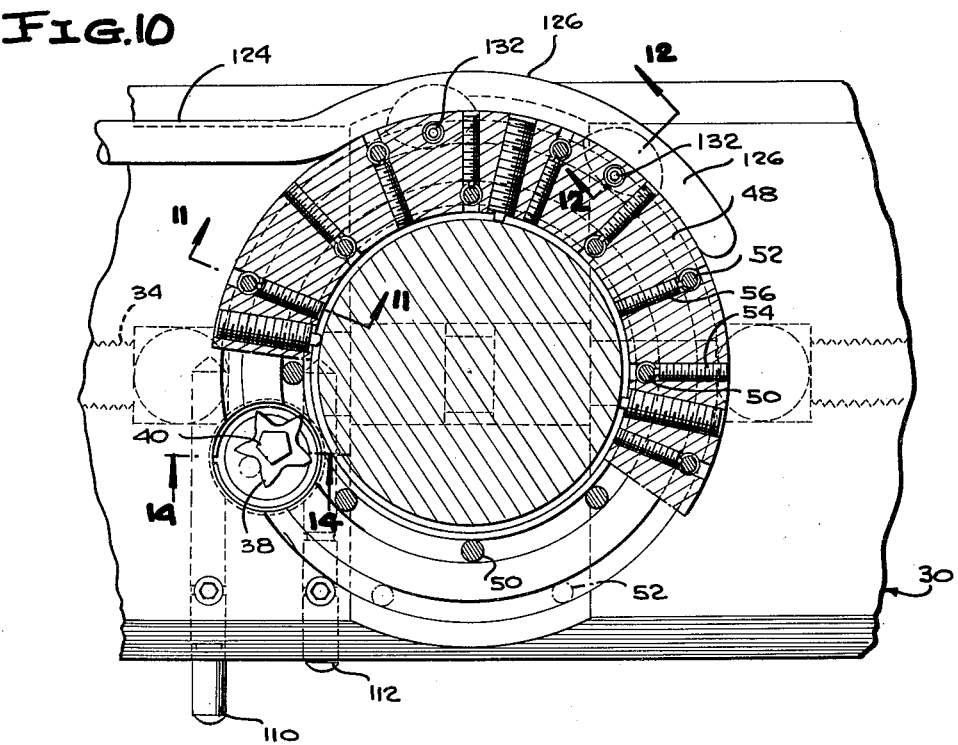
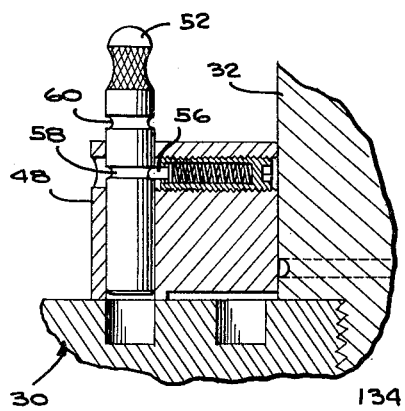
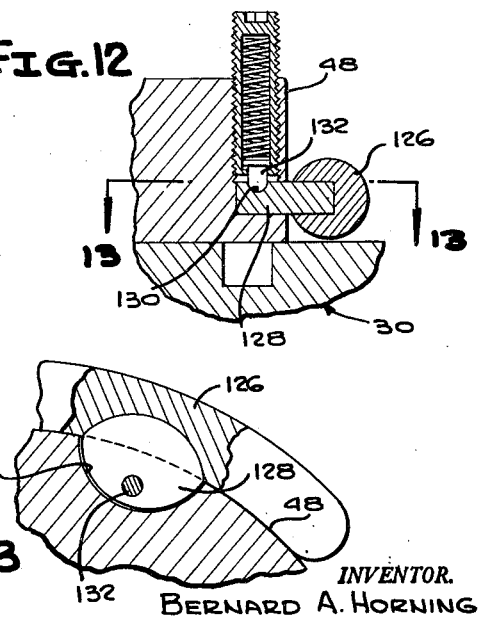
INVENTOR.
BERNARD A. HORNING
BY
McMorrow, Berman & Davidson
ATTORNEYS

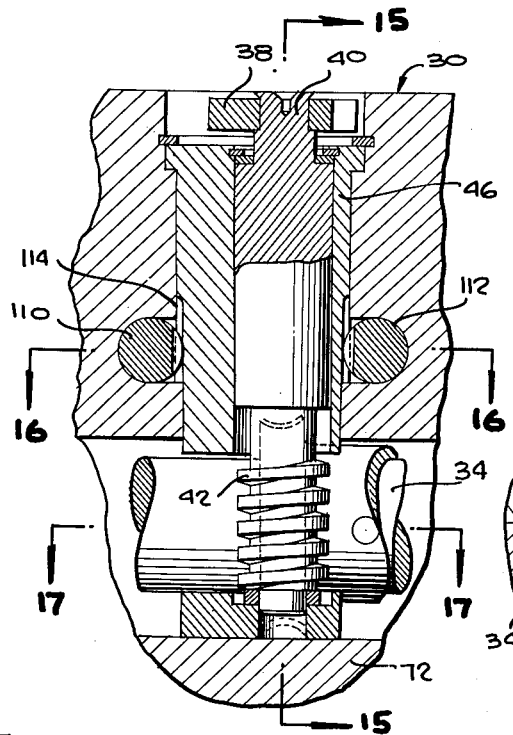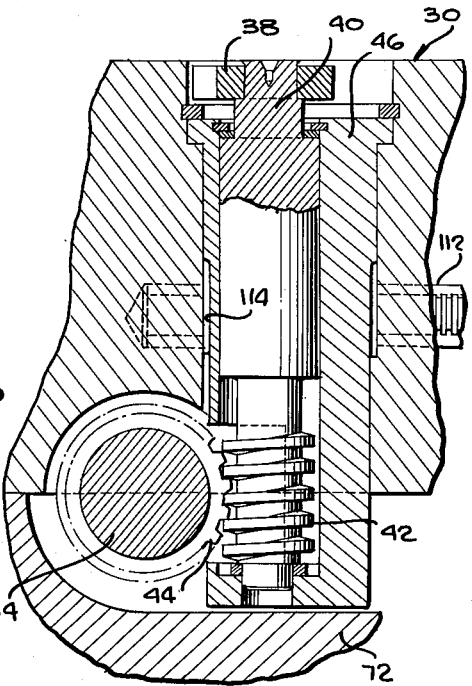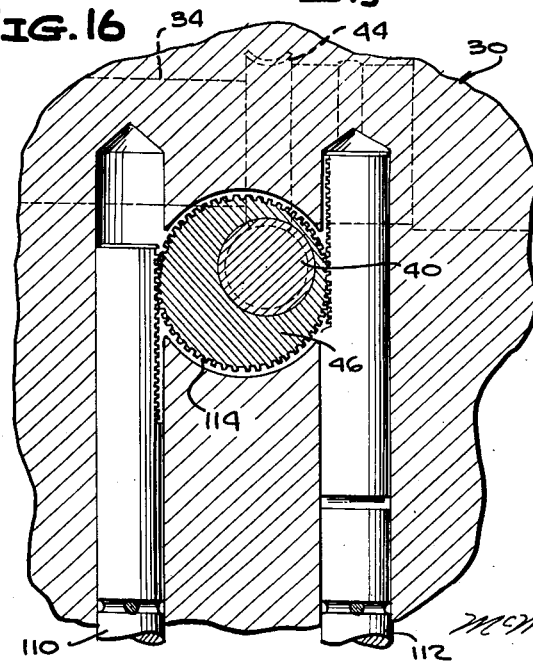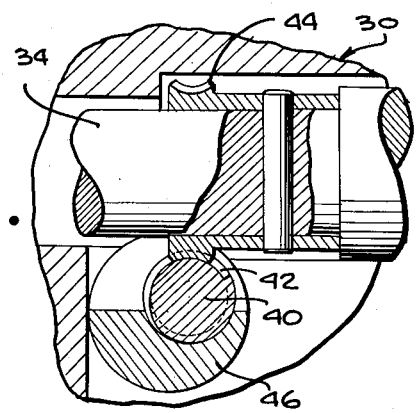

Dec. 11, 1962  B. A. HORNING  3,067,637
UNDERCUTTING TOOL
Filed May 27, 1960  7 Sheets-Sheet 6
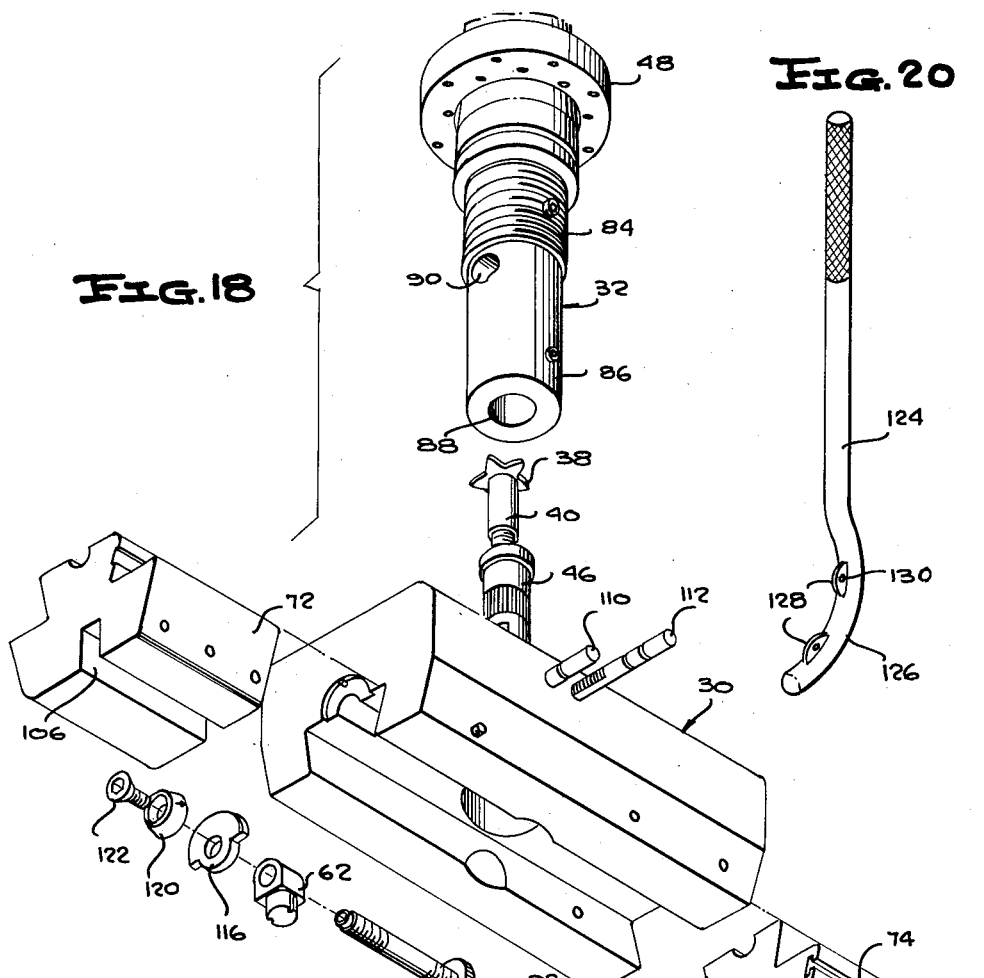
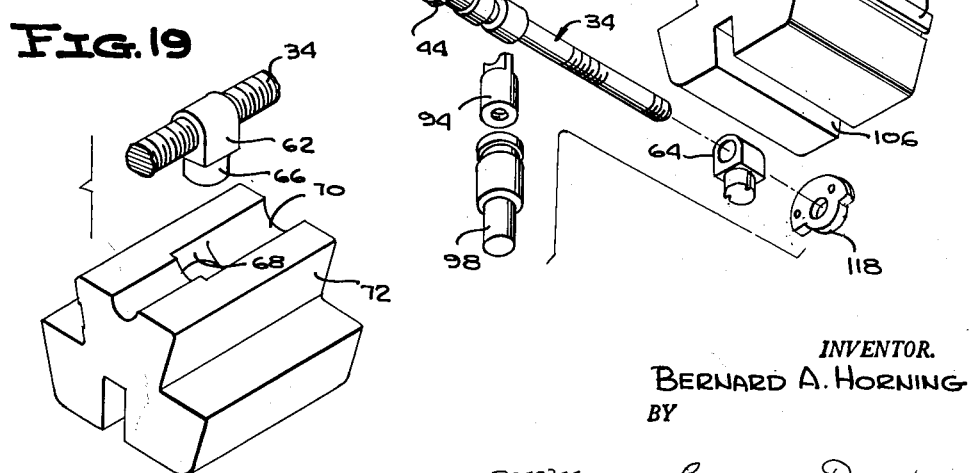
INVENTOR.
BERNARD A. HORNING
BY
McMorrow, Berman & Davidson
ATTORNEYS Dec. 11, 1962     B. A. HORNING     3,067,637
UNDERCUTTING TOOL
Filed May 27, 1960                                 7 Sheets-Sheet 7
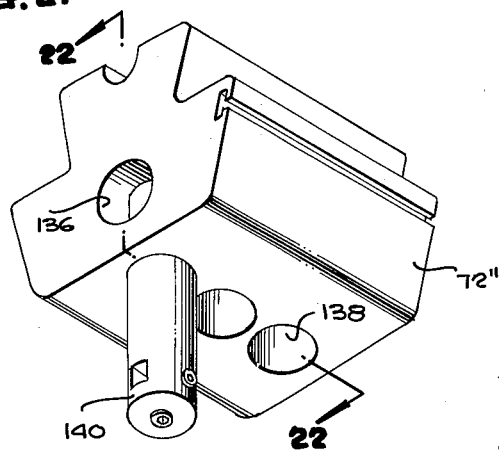
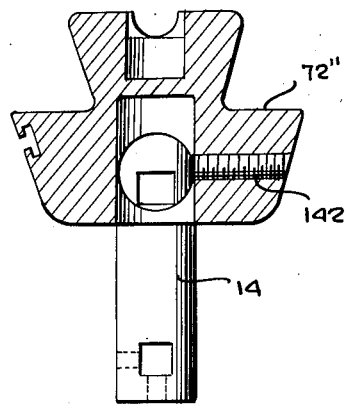
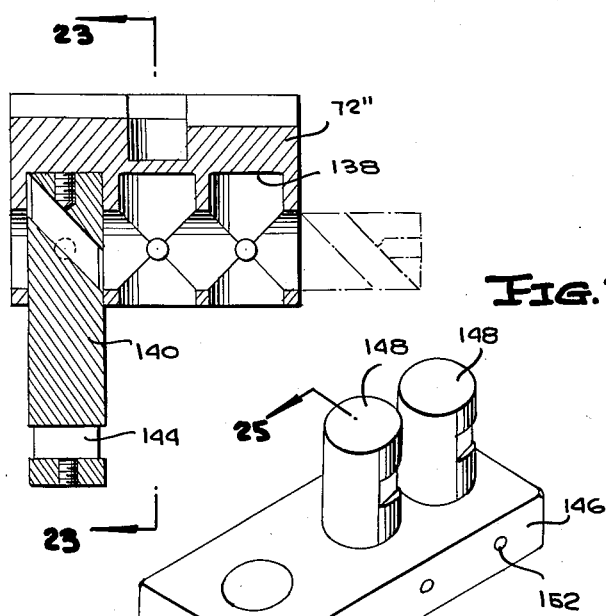
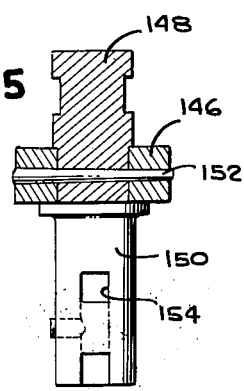
INVENTOR.
BERNARD A. HORNING
BY
McMorrow, Berman & Davidson
ATTORNEYS United States Patent Office 3,067,637
Patented Dec. 11, 1962

3,067,637
UNDERCUTTING TOOL
Bernard A. Horning, 4674 St. Rte. 43, Kent, Ohio
Filed May 27, 1960, Ser. No. 32,356
4 Claims. (Cl. 77—58)

The present invention relates to an undercutting tool with a facing feed generally and in particular to a boring and facing head adapted to rotation in a suitable tool, the head providing precise control means for adjusting the tool holder relative to the head.

An object of the present invention is to provide, in an undercutting tool, a boring head having means for laterally adjusting the tool holder both outwardly and inwardly of the head, and providing means for automatically adjusting the tool holder outwardly or inwardly at any one of several rates of speed relative to rotation of the head.

Another object of the present invention is to provide, in an undercutting tool, a boring head having new and unique advancing means for the tool holder with means for shifting the advancing means into and out of operative position.

These and other objects and advantages of the present invention will be fully apparent from the following description when taken in conjunction with the annexed drawings, in which:

FIGURE 4 is a view on an enlarged scale, taken on the line 4—4 of FIGURE 3;

FIGURE 5 is a view taken on the line 5—5 of FIGURE 4;

FIGURE 7 is a view taken on the line 7—7 of FIGURE 4, on an enlarged scale;

FIGURE 10 is a view on an enlarged scale, taken on the line 10—10 of FIGURE 4;

FIGURE 11 is a view on an enlarged scale, taken on the line 11—11 of FIGURE 10;

FIGURE 12 is a view on an enlarged scale, taken on the line 12—12 of FIGURE 10;

FIGURE 13 is a view taken on the line 13—13 of FIGURE 12;

FIGURE 14 is a view on an enlarged scale, taken on the line 14—14 of FIGURE 10;

FIGURE 15 is a view taken on the line 15—15 of FIGURE 14;

FIGURE 16 is a view taken on the line 16—16 of FIGURE 14;

FIGURE 17 is a view taken on the line 17—17 of FIGURE 14;

FIGURE 18 is an isometric exploded view of the undercutting tool of the present invention;

FIGURE 19 is an exploded isometric view of one of the tool holder slides, showing the feed screw and a follower on the feed screw;

FIGURE 20 is an isometric view of the operating handle;

FIGURE 21 is an isometric view of a modified form of the tool holder slide;

FIGURE 22 is a view taken on the line 22—22 of FIGURE 21;

FIGURE 23 is a view taken on the line 23—23 of FIGURE 22;

FIGURE 24 is an isometric view of an attachment for the underface of the tool holder slide shown in FIGURE 21; and FIGURE 25 is a view taken on the line 25—25 of FIGURE 24.

Referring in greater detail to the drawings in which like numerals indicate like parts throughout the several views, the undercutting tool of the present invention comprises a boring head or block 30 which is arranged transversely of and carried by one end portion of a driven member or spindle 32, the other end portion of the driven end member or spindle being adapted for insertion in a drive means, such as a chuck on a drill press, milling machine, or the like.

A feed screw 34, provided with right hand threads and left hand threads, is mounted in the block 30 for movement in clockwise and counterclockwise directions.

Figure 1:
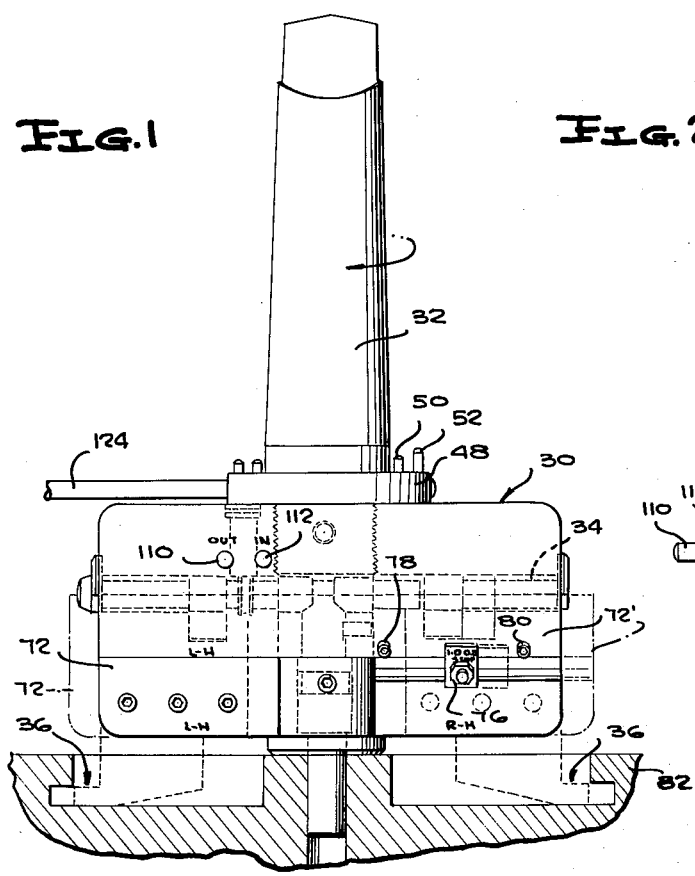
FIGURE 1 is a side elevational view of the undercutting tool according to the present invention.
Figure 2:
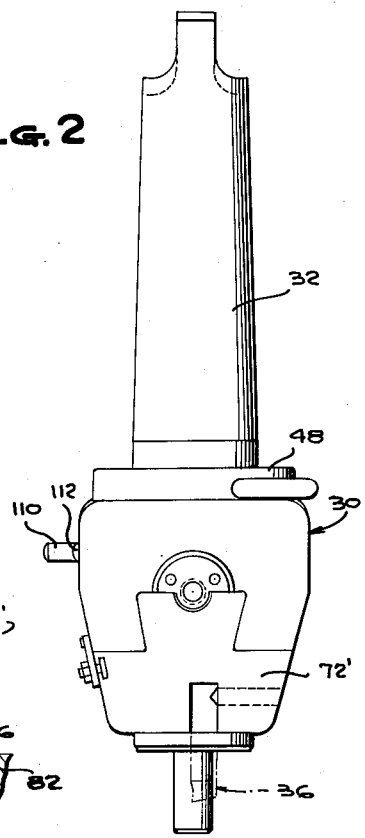
FIGURE 2 is an elevational view taken at 90 degrees relative to FIGURE 1.

A cutting element, shown in dotted lines in FIGURES 1 and 2 and designated by the numeral 36, is connected to each of the right hand and left hand threads of the feed screw 34 for movement therealong responsive to movement of the feed screw 34 in clockwise and counterclockwise directions.

Means is provided by the present invention operatively connected to the feed screw 34 for rotating the latter in either the clockwise or counterclockwise direction. Also, connecting means, carried by the spindle 32, is operable to connect the feed screw rotating means to the feed screw 34 so that the feed screw 34 may rotate in either the clockwise or counterclockwise direction responsive to rotation of the spindle 32.

The feed screw rotating means consists in a rotatable star wheel 38 operatively connected by means of a driven shaft 40, a second motion-imparting element or worm 42 on the shaft 40, and a first motion-imparting element or spur gear 44 on the feed screw 34. The shaft 40 is mounted eccentrically within the sleeve 46, as shown most clearly in FIGURES 14 and 15. The sleeve 46 is rotatable between positions in which the worm 42 is in engagement with the spur gear 44 and positioned in which the worm 42 is out of engagement with the spur gear 44.

The connecting means carried by the spindle 32 and operable to connect the spindle 32 to the first-named means for rotating the feed screw 34 consists in a collar 48 freely rotatable about the spindle 32 and resting upon the upper end face of the block 30. The collar 48 carries a first plurality of retractable and projectable pins 50 arranged in the first circular row about the spindle 32 and a second plurality of retractable and projectable pins 52 arranged in a second circular row about the spindle 32, the respective rows lying along the inner and outer peripheral boundaries of the path of travel of the star wheel 38. The pins 50 or 52 are each projectable into the path of travel of the star wheel when the spindle 32 rotates.

Any single pin 50 or 52 constitutes connecting means operable to connect the spindle 32 to the star wheel 38 and shaft 40 for effecting rotation of the feed screw 34 in either the clockwise or counterclockwise direction.

Selective means is provided operatively connected to such connecting means for rotating the feed screw 34 in either the clockwise or counterclockwise direction at a variable fractional multiple of the rate of rotation of the spindle 32. This selective means constitutes the other pins 50 and 52 in each of the circular rows of pins 50 and 52. In other words, one pin 50 or 52 constitutes a connecting or driving means for the feed screw 34 while the balance of the pins 50 and 52 constitute means for varying the speed of rotation of the feed screw 34 relative to the spindle 32.

As shown in FIGURES 5 and 11, each pin 50 and 52 is held in either the retracted or projected position by means of a spring-biased detent 54, 56.

As shown in FIGURE 10, the detents 56 for the pins 52 face outwardly of the collar 48 while the pins 50 have their detents 54 facing inwardly. The detents 54 and 56 engage the pin 50 or pin 52 in one of two grooves 58 or 60, as shown in FIGURE 11 with respect to one of the pins 52 and the associated detent 56.

A pair of followers 62 and 64, having internal threads matching the left and right hand threads of the feed screw 34 are threadably mounted upon the feed screw 34 for movement toward and away from each other responsive to rotation of the feed screw 34.

One of the followers 62 is shown in FIGURE 19 to have a lower end portion 66 which is receivable in a socket 68 provided in the bottom of a groove 70 provided in a tool holder 72 slidably mounted in the bottom face of the block 30.

Another tool holder 72' is mounted in the other end of the block 30 and differs from the tool holder 72 only in the provision of a slot 74 in one side thereof, as shown most clearly in FIGURE 18.

A slide element 76 is adjustably secured to the tool holder 72' in any position of sliding movement along the slot 74. The adjacent face of the block 30 is provided with stop elements 78 and 80 in the path of movement of the side element 76. This forms a means by which the operator of the machine may visually watch the progress of the tool holder 72' as it moves outwardly or inwardly of the spindle 32 with the cutting element 36 engaged in a work piece, as at 82 in FIGURE 1.

With reference to FIGURES 4, 5, and 18, the spindle 32 has a reduced in size portion 84 provided with external threads and an unthreaded portion 86 depending from the portion 84. The portion 86 has a bore 88 extending inwardly from the lower end and terminating in a cross bore 90 immediately adjacent the portion 84. The feed screw 34 is assembled in the block 30 so that its midpart extends through the cross bore 90 after the spindle 32 has been threadedly engaged in the block 30.

The feed screw 34 is provided with an annular groove 92 in its enlarged midpart, the groove 92 receiving the bifurcated end portion of an upstanding positioning pin 94 insertable into and withdrawable from the bore 88 in the spindle portion 86.

A set screw 96 is employed to secure the positioning pin 94 so that the bifurcated upper end portion is received in the groove 92. The set screw 96 is accessible through the open end of the block 30 prior to the insertion therein of the tool holder 72'.

A centering pin 98 has the portion adjacent its upper end received in the bore 88 below the pin 94 and is adaptable to have its lower end projecting portion inserted in a guide hole in a work piece to be cut by the cutting elements 36.

A set screw 100, extending through the spindle portion 86, is employed to secure the centering pin 98 in its position within the bore 88, as in FIGURE 5. A collar 102 is secured by a set screw 104 to the centering pin 98 below the block 30.

Figure 6:
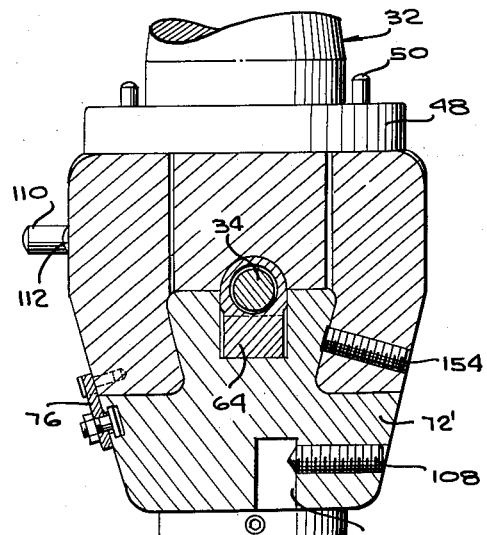
FIGURE 6 is a view taken on the line 6—6 of FIGURE 4.
Figure 8:
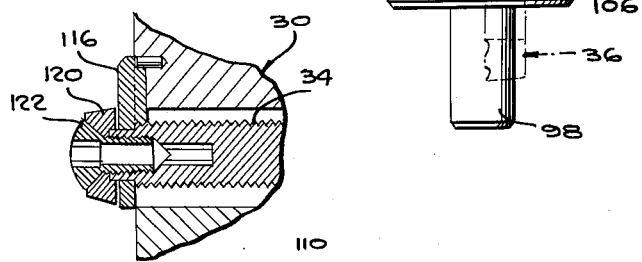
FIGURE 8 is a view taken on the line 8—8 of FIGURE 7.
Figure 9:
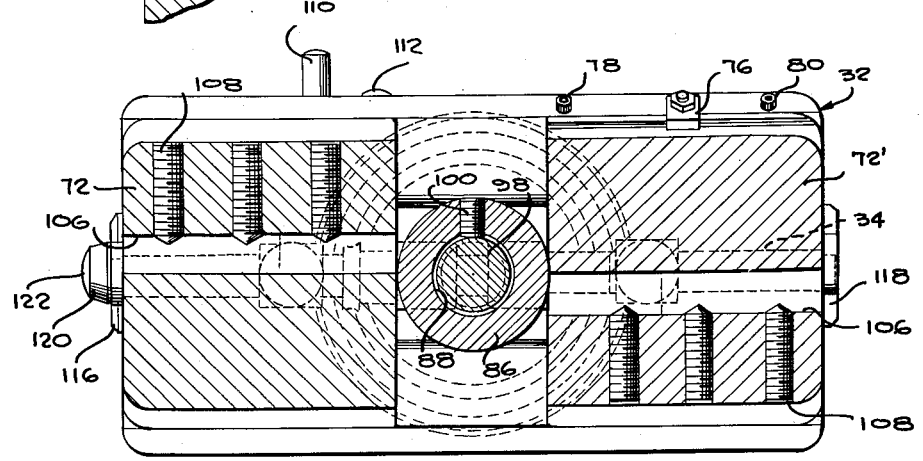
FIGURE 9 is a view taken on the line 9—9 of FIGURE 4.

The tool holders 72 and 72' have slots extending inwardly from the lower end, as at 106 in FIGURE 6 with reference to the tool holder 72'. The slots 106 of the tool holders 72 and 72' are on opposite sides of the center line or longitudinal center line of the feed screw 34, as shown most clearly in FIGURE 9. This is conventional practice in order that the cutting elements 36 be arranged, as shown in dotted lines in FIGURE 6, with their cutting edges on the longitudinal center line.

Set screws 108, here shown to be three in number for each of the tool holders 72 and 72', secure the cutting element 36 in the respective slot 106.

Means is provided by the present invention for shifting the shaft 40 from the position in which the worm 42 engages the spur gear 44 to a position in which the worm 42 is out of engagement with the gear 44. This means consists in, as shown most clearly in FIGURES 14 to 17, a pair of plungers 110 and 112, each having rack teeth on one side thereof inwardly of one end, as shown in FIGURE 16. Projecting end portions of the plungers 110 and 112, exteriorly of the block 30, are alternatingly depressed into the block 30 to cause rotation of the sleeve 46 in clockwise and counterclockwise directions, the sleeve 46 being provided with teeth, as at 114, in mesh with the rack teeth on the plungers 110 and 112.

The shaft 40 is eccentrically mounted within the sleeve 46 and when the plunger 112 is depressed, the worm 42 on the shaft 40 is engaged with the spur gear 44 connected to the feed screw 34. When the plunger 110 is depressed, the sleeve 46 rotates in the opposite direction to shift the shaft 40 to the position in which the worm 42 is out of engagement with the spur gear 44.

The ends of the feed screw 34 are received in collars 116 and 118 (FIGURE 18) which are secured by pins to the ends of the block 30. The collar 116 is provided with indicia (FIGURE 7) and a ring 120 is secured to the feed screw 34 by means of a cap screw 122, the ring 120 having indicia in the shape of an arrow cooperating with the indicia in the collar 116 to indicate the setting of the follower 62 relative to the threads of the feed screw 34.

Figure 3:
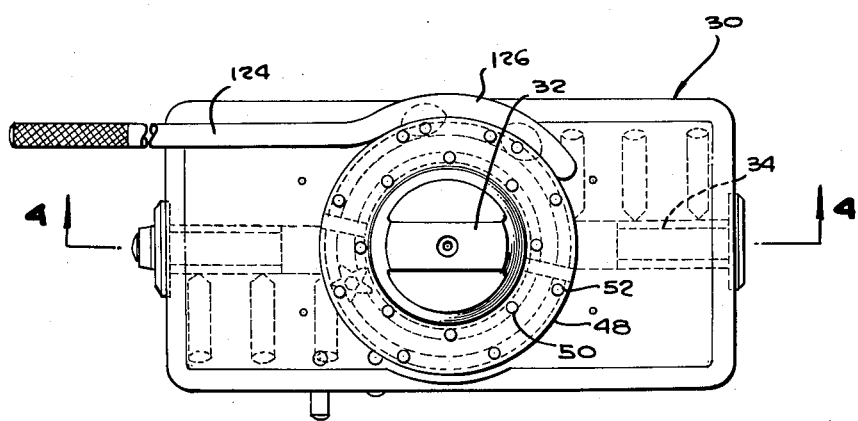
FIGURE 3 is a top plan view.

Means is provided for holding the collar 48 against rotation when it is desired to advance or retract the feed screw 34 by rotating the feed screw 34 relative to the spindle 32. This means consists in a handle 124 (FIGURE 20) having a curve portion 126 inwardly of one end conformably shaped to fit about the periphery of the collar 48. A pair of lugs 128 project inwardly from the concave face of the curved portion 126. Each lug 128 is provided with a hole 130 in which is received a spring-biased detent 132, as shown most clearly in FIGURE 12. As shown in FIGURE 3, the handle 124 is attached to the collar 48 by having the lugs 128 enter arcuately curved notches or grooves 134 provided in the periphery of the collar 48, as shown in FIGURE 13. The detents 132 releasably secure the handle 124 in a position in which, when it is grasped by the hand of the operator of the tool, the collar 48 is prevented from rotation and the spindle 32 rotates relative to the collar 48.

In FIGURES 21 to 23, a modified form of the tool holder is shown and designated generally by the reference numeral 72''. The tool holder 72'' has a longitudinally extending bore 136 extending from one end to the other end and three vertical bores 138 extending upwardly from the bottom face and terminating above the bore 136, as shown in FIGURES 22 and 23. A cylindrical tool holder 140 is positioned below each of the bores 138 and a set screw 142 secures the tool holder in the selected one of the bores 138. The tool holder is provided with a slot, as at 144, for the reception of a cutting bit, in the conventional manner.

In FIGURES 24 and 25, an adaptation for the tool holder 72'' is shown and it consists in a flat block 146 having a pair of cylindrical elements 148 projecting from the upper face and a tool holder 150 projecting from the lower face. The block 146 is positioned below the underface of the tool holder 72'' with the elements 148 received in the bores 138. Pins 152 secure the elements 148 to the block 146 and the tool holder 150 is provided with one or more slots 154 for the reception and retention of a cutting bit of conventional construction.

In use, after the tool is assembled with the proper cutting tool secured in either one or both of the tool holders 72, 72', 72'', the plunger 110 is depressed into the block 30 so as to disengage the worm 42 from the spur gear 44. A wrench applied to the one end of the feed screw 34 may be used to adjust the feed screw in the clockwise or counterclockwise direction to move the cutting elements 36 toward or away from the work piece to be cut. When the elements 36 are adjusted to make a first cut in the work piece, the plunger 112 is pressed inwardly to shift the worm 42 into mesh with the gear 44, the spindle 32 is caused to rotate and the handle 124 is held so that the collar 48 does not rotate. Next, one pin 50 or 52 is depressed so that as the spindle 32 rotates, it carries the pin into engagement with the star wheel 38 and effects the rotation of the star wheel a step at a time to rotate the shaft 40, and effect rotation of the feed screw 34 in either the clockwise or counterclockwise direction. This will serve to advance or retract the cutting element 36 into the work piece at a speed determined by the number of pins 50 or 52 depressed into engagement with the periphery of the star wheel 38.

It will be seen therefore that the undercutting tool of the present invention provides a means for advancing either a double or a single feed screw at a variable rate of speed or retracting the same at a variable rate of speed with the feed screw 34 instantly made inoperative by shifting of the plungers 110 and 112 so that the worm 42 engages or disengages from the spur gear 44.

What is claimed is:

1. An undercutting tool comprising a driven member, a block arranged transversely of and carried by one end portion of said driven member, there being a cross bore in said one end portion of said driven member, a feed screw provided with right-hand threads and left-hand threads, said feed screw extending through and mounted in said bore for movement in clockwise and counterclockwise directions, a follower in threaded engagement with each of said right and left-hand threads of said feed screw, a tool holder connected to each of said followers for movement therewith, a cutting element carried by each of the followers, a first motion-imparting element on said feed screw, a driven shaft disposed on one side of said feed screw and extending parallel to said driven member, a second motion-imparting element on said driven shaft, means mounting said driven shaft in said block for movement of said driven shaft between positions in which said second element is in driving engagement with said first element and in which said second element is out of driving engagement with said first element, a star wheel on said driven shaft, and connecting means carried by said driven member and said block and operable to connect said driven member to said driven shaft so that said feed screw may rotate in either clockwise or counterclockwise direction responsive to rotation of said driven member when said second element of said driven shaft is in driving engagement with said first element of said feed screw, said connecting means embodying spaced retractable and projectible pins arranged to lie along the inner and outer peripheral boundaries of the path of travel of said star wheel carried by said driven member and said block, either one of said pins being projectible into the path of the travel of said star wheel to thereby rotate said feed screw in either the clockwise or counterclockwise directions.

2. An undercutting tool comprising a driven member, a block arranged transversely of and carried by one end portion of said driven member, there being a cross bore in said one end portion of said driven member, a feed screw provided with right-hand threads and left-hand threads, said feed screw extending through and mounted in said bore for movement in clockwise and counterclockwise directions, a cutting element connected to each of said right and left-hand threads for movement therealong responsive to movement of said feed screw in clockwise and counterclockwise directions, a first motion-imparting element on said feed screw, a driven shaft disposed on one side of said feed screw and extending parallel to said driven member, a second motion-imparting element on said driven shaft, means mounting said driven shaft in said block for movement of said driven shaft between positions in which said second element is in driving engagement with said first element and in which said second element is out of driving engagement with said first element, a star wheel on said driven shaft, connecting means carried by said driven member and said block and operable to connect said driven member to said driven shaft so that said feed screw may rotate in either clockwise or counterclockwise direction responsive to rotation of said driven member when said second element of said driven shaft is in driving engagement with said first element of said feed screw, said connecting means including a collar circumposed about said driven member and resting upon said block, a first plurality of retractable and projectable pins arranged in a first circular row about said collar and a second plurality of retractable and projectable pins arranged in a circular row about said collar, the respective rows lying along the inner and outer peripheral boundaries of the path of travel of said star wheel, one or more of the pins in each of said first or second rows being projectable into the path of travel of said star wheel to thereby rotate said feed screw in either the clockwise or counterclockwise direction at variable fractional multiples of the rate of rotation of said driven member.

3. An undercutting tool comprising a driven member, a block arranged transversely of and carried by one end portion of said driven member, there being a cross bore in said one end portion of said driven member, a feed screw provided with right-hand threads and left-hand threads, said feed screw extending through and mounted in said bore for movement in clockwise and counterclockwise directions, a cutting element connected to each of said right and left-hand threads for movement therealong responsive to movement of said feed screw in clockwise and counterclockwise directions, a first motion-imparting element on said feed screw, a driven shaft disposed on one side of said feed screw and extending parallel to said driven member, a second motion-imparting element on said driven shaft, means mounting said driven shaft in said block for movement of said driven shaft between positions in which said second element is in driving engagement with said first element, and in which said second element is out of driving engagement with said first element, a star wheel on said driven shaft, connecting means carried by said driven member and said block and operable to connect said driven member to said driven shaft so that said feed screw may rotate in either clockwise or counterclockwise direction responsive to rotation of said driven member when said second element of said driven shaft is in driving engagement with said first element of said feed screw, said connecting means embodying spaced retractable and projectable pins arranged to lie along the inner and outer peripheral boundaries of the path of travel of said star wheel, carried by said driven member and said block, either one of said pins being projectable into the path of the travel of said star wheel to thereby rotate said feed screw in either the clockwise or counterclockwise direction.

4. The undercutting tool according to claim 3, wherein said means mounting said driven shaft in said block embodies a rotatable sleeve eccentrically surrounding said driven shaft.

References Cited in the file of this patent

UNITED STATES PATENTS

| 124,647 | Wheelock | Mar. 12, 1872 |
| 1,000,898 | Cushing | Aug. 15, 1911 |
| 1,191,813 | Mummert et al. | July 18, 1916 |
| 2,209,867 | Wohlhaupter | July 30, 1940 |
| 2,356,651 | Chandler | Aug. 22, 1944 |
| 2,358,741 | Shelby | Sept. 19, 1944 |

FOREIGN PATENTS

| 270,094 | Switzerland | Nov. 1, 1950 |
| 997,324 | France | Sept. 12, 1951 |
| 1,107,314 | France | Aug. 3, 1955 |